United States Patent [19]
Ruehl

[11] Patent Number: 5,191,765
[45] Date of Patent: Mar. 9, 1993

[54] MASTER CYLINDER FOR A HYDRAULIC BRAKE SYSTEM AND STEERING BRAKE SYSTEM

[75] Inventor: Ute Ruehl, Rosbach, Fed. Rep. of Germany

[73] Assignee: Alfred Teves GmbH, Frankfurt am Main, Fed. Rep. of Germany

[21] Appl. No.: 634,172

[22] PCT Filed: Feb. 8, 1990

[86] PCT No.: PCT/EP90/00202

§ 371 Date: Dec. 17, 1990

§ 102(e) Date: Dec. 17, 1990

[87] PCT Pub. No.: WO90/12714

PCT Pub. Date: Nov. 1, 1990

[30] Foreign Application Priority Data

Apr. 21, 1989 [DE] Fed. Rep. of Germany ....... 3913353
Nov. 6, 1989 [DE] Fed. Rep. of Germany ....... 3936832

[51] Int. Cl.[5] .................. B60T 11/21; B62D 11/08
[52] U.S. Cl. ......................... 60/581; 60/588
[58] Field of Search ............ 60/581, 591, 547.1, 60/561, 579, 585, 588, 589

[56] References Cited

U.S. PATENT DOCUMENTS

| | | | |
|---|---|---|---|
| 2,065,044 | 12/1936 | Bowen | 60/581 |
| 2,207,127 | 7/1940 | Brie | 60/589 |
| 3,064,434 | 11/1962 | Parrett | 60/581 |
| 3,416,315 | 12/1968 | Wortz | 60/561 X |
| 3,416,316 | 12/1968 | Lewis | 60/581 |
| 3,421,320 | 1/1969 | Kershner | 60/581 X |
| 3,699,679 | 10/1972 | Bardos et al. | 60/581 X |
| 4,254,624 | 3/1981 | Gaiser | 60/591 X |
| 4,294,070 | 10/1981 | Farr | 60/561 X |
| 4,488,405 | 12/1984 | Price et al. | 60/581 |
| 4,876,853 | 10/1989 | Shirai et al. | 60/588 X |

FOREIGN PATENT DOCUMENTS

| | | |
|---|---|---|
| 2038974 | 2/1972 | Fed. Rep. of Germany . |
| 3219042 | 12/1982 | Fed. Rep. of Germany . |
| 3240747 | 5/1983 | Fed. Rep. of Germany . |
| 3317611 | 11/1984 | Fed. Rep. of Germany . |
| 2139720 | 11/1984 | United Kingdom . |
| 2162263 | 1/1986 | United Kingdom . |

Primary Examiner—Edward K. Look
Assistant Examiner—John Ryznic
Attorney, Agent, or Firm—Robert P. Seitter; J. Gordon Lewis

[57] ABSTRACT

In order to reduce the number of component parts required for a master cylinder incorporated in a hydraulic brake system and steering brake system which is composed of two master cylinders interconnected through a compensating line, it is suggested by the present invention that the compensating line (60) be connected to a compensating chamber (22) adjacent to the pressure chamber (21), and that a valve assembly isolating the pressure chamber (21) from the compensating chamber (22) be formed by a sealing cup (7) arranged on an operating piston (3) that is actuatable by the master cylinder piston (2).

14 Claims, 4 Drawing Sheets

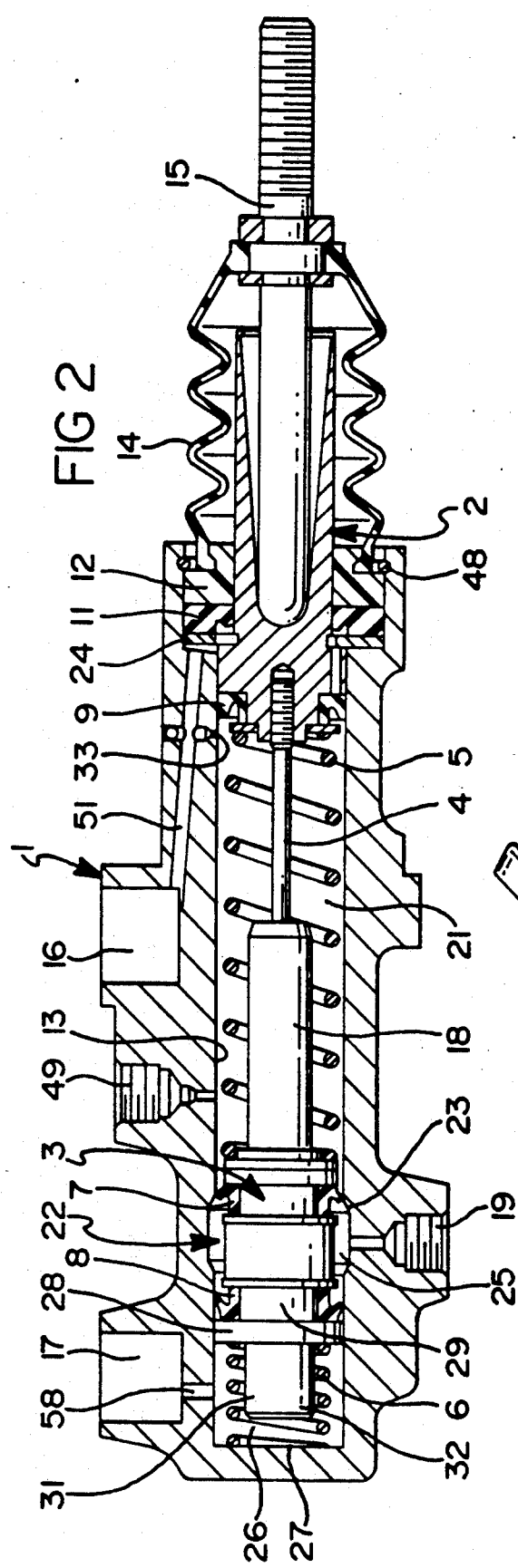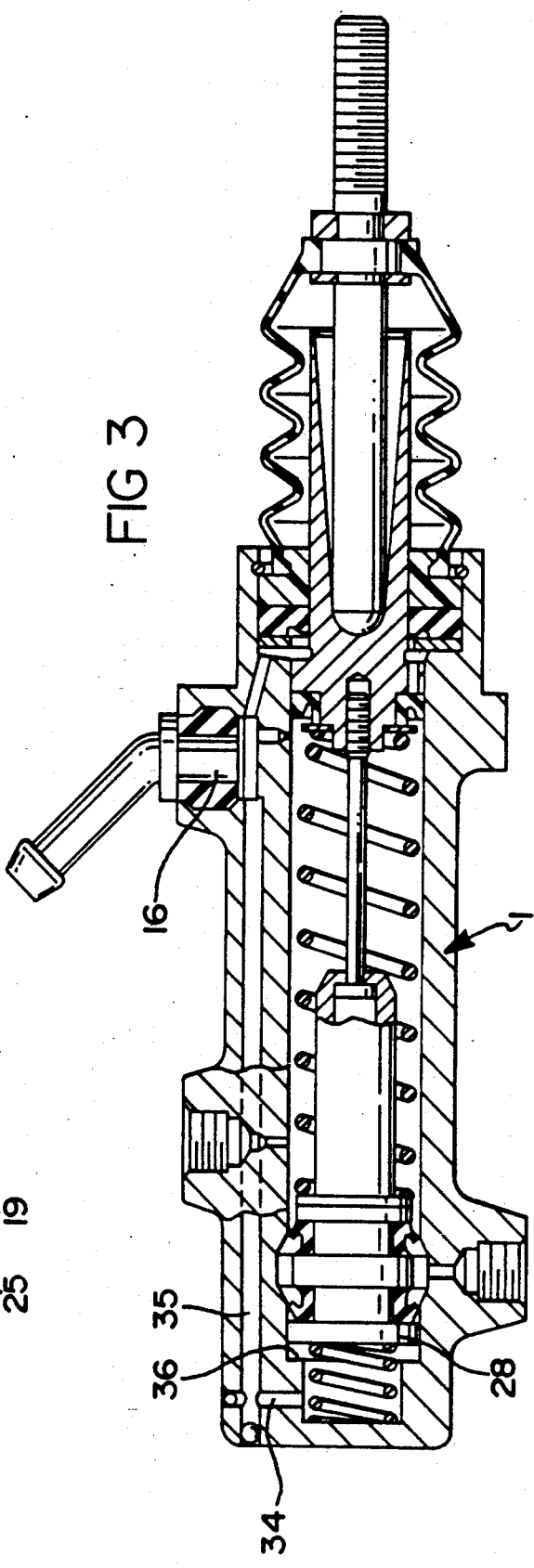

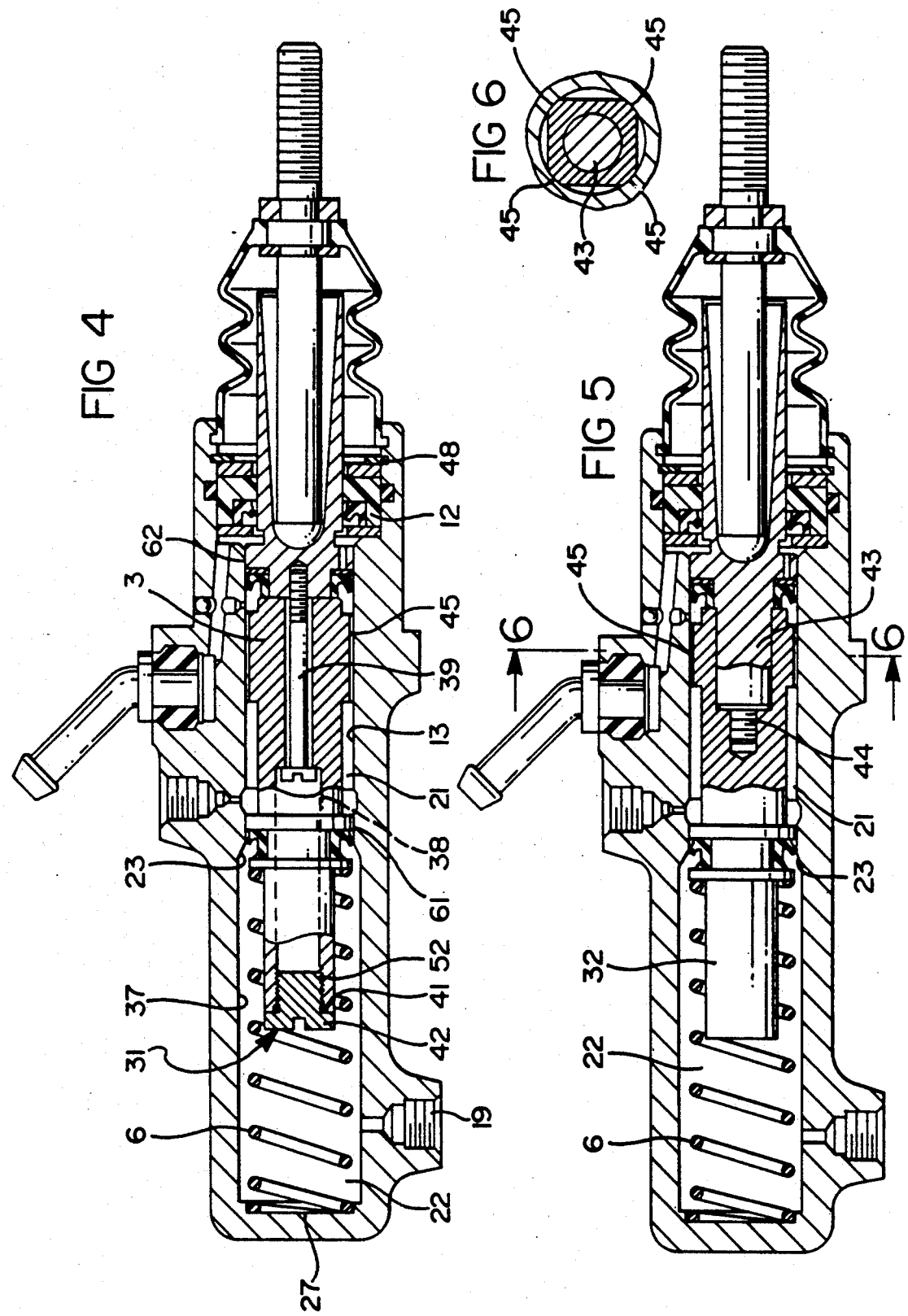

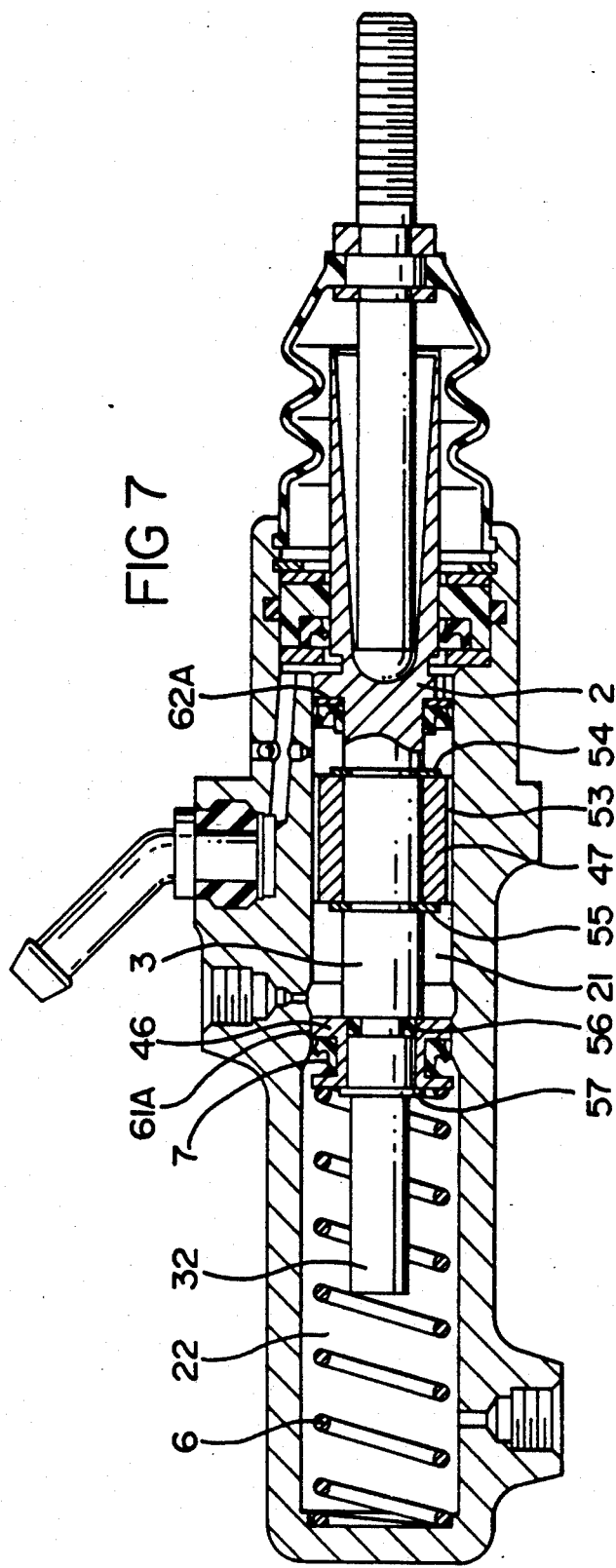

MASTER CYLINDER FOR A HYDRAULIC BRAKE SYSTEM AND STEERING BRAKE SYSTEM

INTRODUCTION

The present invention relates to a master cylinder for a hydraulic brake system and steering brake system for automotive vehicles, comprising a pair of master cylinders which are operable simultaneously for braking a vehicle and independently of one another for power steering, each being furnished with one pedal-operated piston that is slidably guided in a bore in the master cylinder housing and confines a pressure chamber, the said pressure chambers being in communication with an unpressurized pressure-fluid supply reservoir, being connectible to brakes on wheels on opposite sides of the vehicle and becoming interconnected through a compensating line when the master cylinders are actuated simultaneously and/or isolated from each other by way of a valve assembly when one of the master cylinders is actuated alone.

BACKGROUND OF THE INVENTION

A like master cylinder is known from German published patent application 32 19 042. In order to be able to connect the above-mentioned compensating line, the housing of the prior known master cylinder contains a radial outlet duct in which a compensating valve is arranged whose closure member closes and/or opens a compensating port terminating into the pressure chamber. To actuate the closure member, there is provision of a ball-shaped thrust member cooperating with the master cylinder piston and being guided in the compensating port at a distance from the closure member. At its front end, the housing of the known master cylinder contains a fill hole which represents a hydraulic connection between the pressure chamber and a pressure-fluid supply reservoir and is controllable by means of a feed valve operable by the master cylinder piston.

What has to be considered less favourable in the priorly known master cylinder are the comparatively high manufacturing and assembling costs which above all are due to the employment of several component parts which are required in particular for realising the feed valve and compensating valve.

SUMMARY OF THE INVENTION

Therefore, it is an object of the present invention to devise a master cylinder of the species initially referred to wherein the number of necessary component parts can be reduced.

This object is achieved according to this invention in that the compensating line connects to a compensating chamber adjoining the pressure chamber, and in that the valve assembly is formed by a sealing cup arranged on an operating piston that is actuatable by the primary piston.

To specify the inventive idea, it is suggested that a slope be designed at the transition from the pressure chamber to the compensating chamber, in whose and-/or after whose area facing the pressure chamber the sealing cup is abutting.

A favorable improvement of the subject matter of this invention which lends itself to ease of manufacture and is reliably operating resides in that the compensating chamber is formed by a larger-diameter annular chamber which is designed in the bore and which is isolated from an unpressurized chamber sealing element arranged at the operating piston, the unpressurized chamber being confined by the bottom of the bore, on the one hand, and by a guiding collar designed on the operating piston, on the other hand, and in that the sealing element is designed as a second sealing cup which is arranged in an annular groove and whose flank averted from the compensating chamber is formed by the guiding collar. Improvement of the operating piston's guidance is accomplished owing to this measure.

Another advantageous improvement of this invention arranges for the operating piston to be provided with a stop which, on actuation, abuts on the master cylinder housing and is formed by an axial cylindrical extension of the operating piston which contacts the bottom of the bore.

In a master cylinder according to the species whose piston is furnished with a primary cup which, in the inactive position, is arranged at a distance from the port of a breather bore interconnecting the pressure-fluid supply reservoir and the pressure chamber, it is proposed according to this invention that the end surface of the extension be positioned in the inactive position at a distance from the bottom which corresponds to the distance between the primary cup and the breathering bore.

Owing to this measure, unpressurized opening of the connection between the pressure chamber and the compensating chamber is safeguarded, since the sealing cup lifts from the slope before the breather bore is overridden by the primary cup.

To prevent the ingress of dirt or moisture into the interior of the inventive master cylinder, another embodiment of the inventive subject matter provides that the unpressurized chamber is connectible with the pressure-fluid supply reservoir. In a particularly compact improvement, it is suggested that pressure-fluid ducts be provided in the master cylinder housing which connect the unpressurized chamber to a reservoir port constituting a connection between the pressure chamber and the pressure-fluid supply reservoir.

The invention's subject matter is considerably simplified, while its overall axial length is simultaneously shortened, in that the operating piston is in direct abutment on the piston and is operatively and positively engaged therewith, with the compensating chamber being formed by the portion extending between the bottom of the bore and the slope. The operating piston contains a through-bore which receives a screw bolt coupling the operating piston to the piston and which is closed by a threaded plug that is furnished with a seal and forms the stop of the operating piston on the bottom of the bore. This measure accomplishes to protect a compression spring arranged in the compensating chamber and resetting the two pistons against being damaged.

Another favorable variant of embodiment of the subject matter of this invention provides that the piston comprises an axial cylindrical extension on which the operating piston is mounted and is screwed to a threaded portion designed on the extension. The two pistons being precisely fitted accomplishes their proper centering. Preferably, the operating piston can be furnished with cylinder-shaped guiding surfaces which cooperate with the wall of the bore designed in the housing.

A design of the inventive subject matter which lends itself to an especially cost-efficient manufacture is achieved in that the operating piston including its extension is designed integrally with the piston, and in that the sealing cup is retained by a sleeve that is slid on the operating piston and is sealed and unslidably arranged in relation to the operating piston. At the transition from the piston to the operating piston, a guiding sleeve is undisplaceably arranged which cooperates in the pressure chamber with the wall of the bore.

Further features and advantages of this invention can be gathered from the following description of five embodiments, with parts corresponding to each other being assigned like reference numerals. The invention makes reference to the accompanying drawings.

BRIEF DESCRIPTION OF THE DRAWINGS

FIG. 2 is a longitudinal cross-section through a first embodiment of the inventive master cylinder;

FIG. 3 is a longitudinal cross-section through a second embodiment of the inventive master cylinder;

FIG. 4 is a longitudinal cross-section through a third embodiment of the inventive master cylinder;

FIG. 5 is a longitudinal cross-section through a fourth embodiment of the inventive master cylinder;

FIG. 6 is a partial section A—A according to FIG. 5; and

FIG. 7 is a longitudinal cross-section through a fifth embodiment of the inventive master cylinder.

Figure 1:
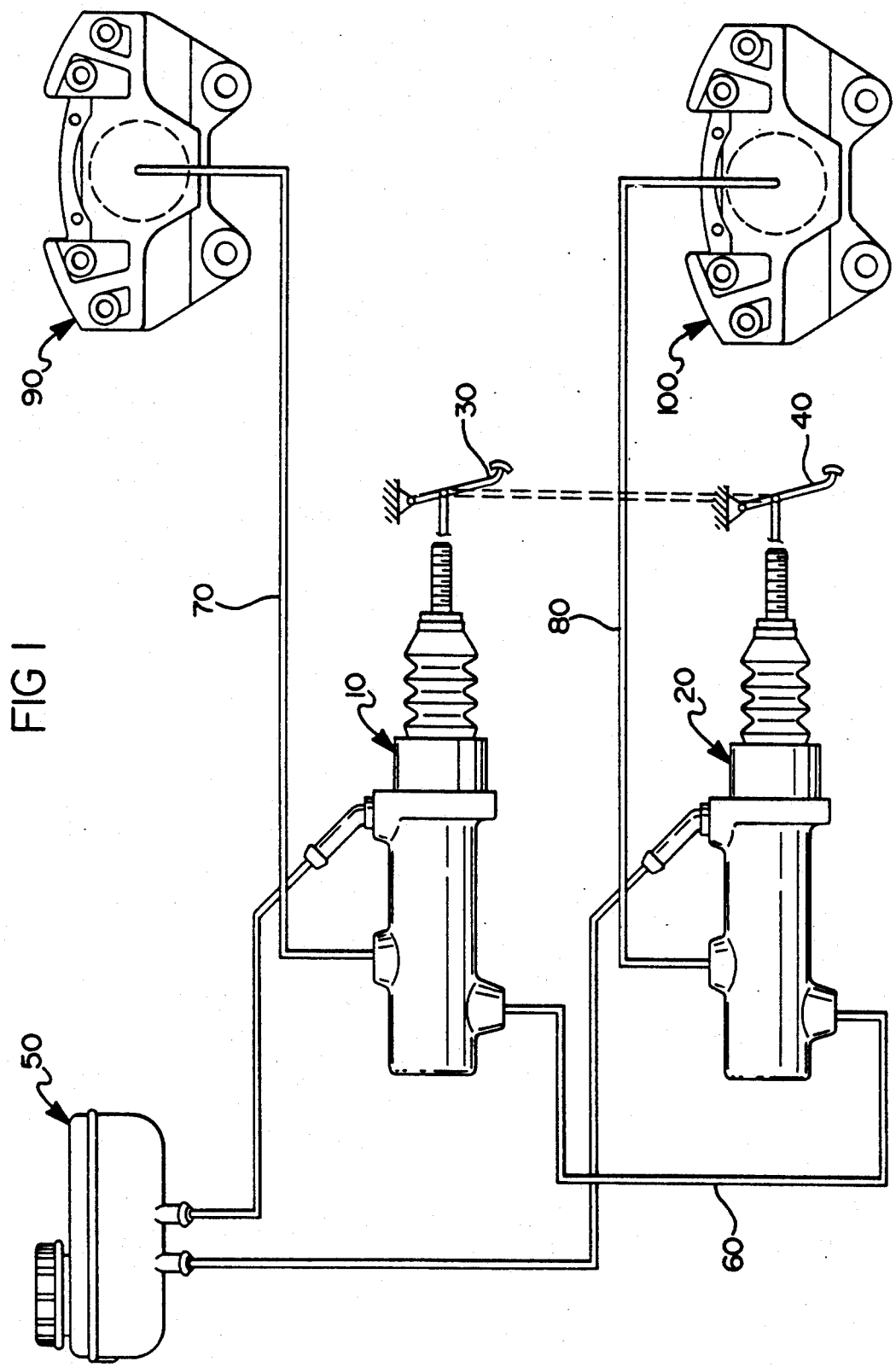
FIG. 1 shows the application of two identical master cylinders according to the invention in a hydraulic brake system and steering brake system for vehicles in a purely schematic representation.

DETAILED DESCRIPTION OF THE PREFERRED AND ALTERNATIVE EMBODIMENTS OF THE INVENTION

As is shown in FIG. 1, the brake system and steering brake system is composed of a first master cylinder 10, a second master cylinder 20, brake lines 70 and 80 as well as two brakes 90 and 100 associated with the driven axle of an automotive vehicle. The master cylinders 10 and 20 interconnected by a compensating line 60 are in communication with an unpressurized pressure-fluid supply reservoir 50 and are operable individually and/or jointly (illustrated in dotted line) via brake pedals 30, 40. The brake system and steering brake system shown in FIG. 1 operates as follows: when the two brake pedals 30, 40 are operated simultaneously for the purpose of braking the driven vehicle wheels, pistons of the two master cylinders 10, 20, which pistons are not described in more detail, will be displaced so that hydraulic pressure develops in their pressure chambers. At the same time, non-illustrated compensating valves seated on the connecting points of the compensating line 60 will be opened so that pressure balance is achieved between the pressure chambers of the two master cylinders 10, 20. The pressure prevailing in the pressure chambers propagates via the brake lines 70, 80 to the brakes 90, 100 of the driven vehicle axle and effects actuation thereof. The braking operation described in the foregoing ensures an absolutely even pressure increase in the two brake lines 70, 80 and, respectively, a completely uniform braking of the two wheels.

Only one of the two master cylinders 10, 20 is actuated for the purpose of steering brake operation. When e.g. the primary piston of the master cylinder 10 is displaced, then pressure develops in it's pressure chamber which, via the brake line 70, acts upon the brake 90, yet at the same time acts also via the now open compensating valve and the compensating line 60 on the closed compensating valve of the second master cylinder 20. However, since the latter's piston remains non-actuated and hence the compensating valve remains closed, the passage to the other brake line 80 remains closed as well, in consequence whereof the other wheel brake 100 is unpressurized. Because the construction of the master cylinders 10, 20 is identical, only one of the two will be explained hereinbelow.

The master cylinder shown in FIG. 2 comprises a master cylinder housing 1 whose longitudinally extending bore 13 is closed at one end by a bottom 27, the said bore receiving a primary piston 2 as well as an operating piston 3 inserted thereafter in respect of the direction of actuation. The master cylinder housing 1 contains four hydraulic ports 16, 17, 19 and 49, the purpose of which will be described in more detail in the following text. In the inactive position, the primary piston 2 which carries a primary cup 9 takes support via a metallic stop washer 24 on a seal, for instance a boot 11 or a ring seal, which is axially abutting a closure member 12. The closure member 12 is held in the master cylinder housing 1 by means of a circlip or spring clip 48 and includes a radial circumferential groove which is not referred to in detail and which receives one end of an elastic pleated bellows 14, the other end whereof is attached to a piston rod 15 actuating the piston 2 and being coupled to a brake pedal.

The primary piston 2 confines in the bore 13 a hydraulic pressure chamber 21 which, via a breather bore 33 terminating therein as well as via a pressure fluid duct 51 extending up to the stop washer 24, connects with the hydraulic port 16, to which the pressure-fluid supply reservoir 50 can be connected that has been mentioned in respect of FIG. 1. A brake line leading to the wheel brake is connected to the second port 49 that is in communication with the pressure chamber 21.

Moreover, the pressure chamber 21 accommodates a first compression spring 5 which is interposed between the piston 2 and the operating piston 3. The compression spring 5 is captivated on the piston 2 by means of a stop sleeve 18 as well as a captivating screw 4 bearing against said stop sleeve 18, the screw 4 being threaded into the end face of the piston 2.

Succeeding the pressure chamber 21 in the direction of actuation is a compensating chamber 22 which, via the third hydraulic port 19, is connectible to the compensating line 60 (FIG. 1) and which, as a larger-diameter annular chamber 25 designed in the bore 13, is isolated from the pressure chamber 21 by virtue of a sealing cup 7 arranged at the operating piston 3. At the transition from the pressure chamber 21 to the compensating chamber 25, a circumferential slope 23 is designed in the bore 13 and is coacting with the sealing cup 7 arranged on the operating piston 3.

The compensating chamber 25 is adjacent to an unpressurized chamber 26, which is designed on the end of the bore 13, which is bounded, on the one hand, by a sealing element 8 mounted on the operating piston 3 and, on the other hand, by the bottom 27 of the bore 13, and is in communication via a radial passage 58 with the fourth port 17. The port 17 either can be open in relation to the atmosphere, or it can be connected to the pressure-fluid supply reservoir. In the illustrated example, the sealing element 8 is formed by a second sealing cup which is incorporated in a radial annular groove 29 designed on the operating piston 3. On the left-hand side in the drawing, the annular groove 29 is confined by a guiding collar 28 whose diameter corresponds to that one of the bore 13 and which serves as an abutment surface for a second compression spring 6 which is supported on the end wall 27. The spring force of the second compression spring 6 is less than that of the first compression spring 5. The movement of the operating piston 3 in the direction of actuation is limited by a stop 31 which is formed by an axial extension 32 of the operating piston 3 in the subject matter of FIG. 2. In the inactive position, the end surface of the extension 32 is at a distance from the end wall 27 which corresponds to the distance between the primary cup 9 and the breather bore 33. It is thereby ensured that, on actuation, the sealing cup 7 lifts from the slope 23 before hydraulic pressure can develop in the pressure chamber 21.

In the master cylinder design according to this invention displayed in FIG. 3, the unpressurized chamber 26 is designed as a stepped blind-end bore. The mentioned step is formed by a radial annular surface 36, on which the operating piston 3 will abut with its guiding collar 28 on actuation. The external diameter of the second compression spring 6 corresponds roughly to the diameter of the bore portion which accommodates the compression spring 6 and forms the unpressurized chamber 26. In this embodiment, the unpressurized chamber 26 is in direct communication with the reservoir port 16 by means of pressure-fluid ducts 34 and 35 designed in the master cylinder housing 1. A modified version is likewise possible, wherein the operating piston is provided with an axial recess which receives the second compression spring 6 in part.

Regarding the master cylinder shown in FIG. 4, operating piston 3 is fixed to be axially directly abutting piston 2. The compensating chamber 22 is formed by the bore portion 37 and land 61 which is adjacent to the pressure chamber 21 and defined by land 62 on the brake pedal end of the piston 2 and bore 13. The compensating chamber 22 extends between the land 61 adjacent the slope 23 and the bottom 27 of the bore 27. A portion of the operating piston 3 intermediate the axially spaced lands 61, 62 is furnished with a support structure having cylinder-segment-shaped guiding surfaces 45 (see also FIG. 6). The operating piston 3 includes an axial through-bore 38 which accommodates a screw bolt 39 connecting the operating piston 3 with the piston 2 and which is furnished at its open end with a thread 52 into which a threaded plug 42 is turned. In order to safeguard complete isolation between the two hydraulic chambers 21, 22, the threaded plug 42 carries a ring seal 41 which seals the bore 38 in relation to the compensating chamber 22. Since the threaded plug 42 simultaneously forms the stop 31 of the operating piston 3, the compression spring 6 is effectively protected against damage during operation. In a steering brake operation, during which only one of the two master cylinders (FIG. 1) is operated, the sealing cup 7 of the operating piston 3 of the non-actuated master cylinder is acted upon by the hydraulic pressure prevailing in the pressure chamber of the other master cylinder so that the resultant force which acts in opposition to the direction of actuation must be absorbed either by the circlip 48 or by the pedal stop.

In the embodiment of the inventive subject matter illustrated in FIGS. 5 and 6, better centering of the operating piston 3 is accomplished in that the piston 2 is provided with an axial, preferably cylindrical extension 43 onto which the operating piston 3 is slid and screwed to the piston 2 by means of a threaded portion 44 designed on the extension 43.

In the design variant shown in FIG. 7, finally, the operating piston 3 is of integral design with the piston 2. In the connecting area of the two pistons 2, 3, a guiding sleeve 47 is unslidably arranged which is provided with similar cylinder-segment-shaped guiding surfaces 53 acting as a support structure similar to those shown in FIG. 6. The guiding sleeve 47 is seated between two circlips 54, 55 inserted into corresponding annular grooves designed in the connecting portion.

The sealing cup 7 isolating the compensating chamber 22 from the pressure chamber 21 is placed on a sleeve 46 formed with a land 61A axially spaced from land 62A with the sleeve 47 disposed therebetween. The sleeve 46 is mounted on the operating piston 3, that is sealed relative to the operating piston 3 by means of a ring seal 56 and is protected against axial displacement by a third circlip 57. Simultaneously, the sleeve 46 that is supported on a larger-diameter step designed on the operating piston 3 serves as a supporting surface for the compression spring 6 arranged in the compensating chamber 22 and resetting the two pistons 2, 3.

What is claimed is:

1. A hydraulic brake and brake steering system for an automotive vehicle having a wheel brake on either side of said vehicle, said system comprising:

a pair of master cylinders each including a master cylinder housing having a bore formed therein and a primary piston slidably mounted therein and defining in part at one end a pressure chamber, said primary piston movable between a first retracted position and a second advanced position in said bore;

means for supplying brake fluid to said system including a pressureless storage reservoir containing fluid and supply passage means allowing fluid flow into each of said pressure chambers with said primary pistons in said retracted position;

a pair of brake pedals, each drivingly engaged with a respective primary piston to enable pressurization of a respective pressure chamber by causing advancing movement thereof;

a pair of operating pistons, each mounted in a respective master cylinder housing bore adjacent an associated primary piston and defining in part a respective compensating chamber separate from an associated pressure chamber therein, said operating pistons movable in said bore between a first retracted position and a second advanced position;

return spring means associated with a respective primary piston and associated operating piston urging each of said primary pistons and associated operating piston to said retracted, first position thereof;

sealing means carried by each operating piston acting to seal an associated compensating chamber from its associated pressure chamber in said first retracted position of the respective operating pistons and open communication therebetween in said second advanced position in said bore of said operating pistons;

compensating fluid passage means extending between said respective compensation chambers to establish fluid communication therebetween;

fluid passage means extending between each master cylinder pressure chamber and a respective one of said wheel brakes;

a driving interconnection between each primary piston and an associated operating piston causing said associated operating piston to advance from said first position to said second position as said primary piston is advanced from said retracted position to said advanced position by operation of an associated brake pedal, whereby upon operation of both of said brake pedals, both primary pistons are advanced to advance both of said operating pistons and establish communication between said pressure chambers via said compensating chambers and said compensating fluid passage means but when only one of said brake pedals is operated, the other compensating chamber remains sealed from its associated pressure chamber.

2. The brake system according to claim 1, wherein said sealing means further includes means operative to seal one of said pressure chambers from its associated compensating chamber upon pressurization of said compensating chamber by the other pressure chamber via said compensating fluid passage means upon operation of the one of said brake pedals to actuate one of said primary pistons associated with said one pressure chamber when the other of said brake pedals and primary pistons are not operated, 3. The system according to claim 1, wherein said supply passage means includes a bore entering into each pressure chamber opened with an associated piston in said retracted position and closed after a predetermined extent of advancing movement thereof.

4. The system according to claim 3, further including stop means associated with each of said operating pistons acting to positively stop further advancing movement of each operating piston upon reaching said second position thereof, wherein said driving interconnection between each of said primary pistons and an associated operating piston allows continuing advance of each of said primary pistons after said associated operating pistons has been positively stopped, and wherein said supply passage means bore is located to insure that each pressure chamber remains unpressurized until after said associated operating piston has been positively stopped.

5. The system according to claim 4, wherein said driving connection comprises an intervening spring between each of said primary pistons and its associated operating piston, and a return spring acting on each operating piston on the other end thereof from said associated primary piston.

6. The system according to claim 1, wherein each of said operating pistons is configured to not be urged in the direction of said second position upon pressurization of said compensating chamber to remain in said first position upon operation of only said one of said brake pedals.

7. The system according to claim 6, wherein each of said operating pistons is configured with axially spaced opposite seals defining said compensating chambers therebetween, said seals of equal diameter so that pressurization of said compensating chamber does not produce a force acting to urge said compensating piston to said second position.

8. The system according to claim 1 wherein each of said operating pistons is configured with an end thereof remote from said associated primary piston defining said compensating chamber, whereby pressurization of said compensating chamber urges said operating piston towards said associated primary piston.

9. The system according to claim 1, wherein said sealing means comprises a lip seal carried by each operating piston and also a configuration of an adjacent portion of said associated housing bore which enlarges in the axial direction so as to create an annular clearance therebetween upon movement of a respective operating piston to said second position.

10. The system according to claim 9, wherein each of said lip seals are configured to be subjected to pressure in its associated compensating chamber when its associated operating piston is in said first position so as to increase sealing engagement with said bore.

11. The system according to claim 1, wherein each of said primary and operating pistons are in abutment with each other when in said respective retracted, first positions, and wherein said return spring means comprises a pair of return springs, each acting on an end of a respective operating piston remote from its associated primary piston.

12. The system according to claim 1, wherein each of said primary pistons and its associated operating piston are connected together, a land formed at one end of each of said primary pistons adjacent its associated brake pedal defining said associated pressure chamber and another land on each of said operating pistons axially spaced from said first mentioned land, defining said associated compensating chamber.

13. The system according to claim 10, further including a support structure intermediate said lands having portions engaging said bore but with clearance spaces therein defining openings allowing fluid flow therepast.

14. The system according to claim 13, wherein said sealing means includes a lip seal carried by each operating piston adjacent said another land, said bore adjacent said lip seal and another land enlarging in the axial direction towards said second position to create an annular clearance as said operating pistons move to said second position.

* * * * *